(12) United States Patent
Irassar et al.

(10) Patent No.: US 7,478,401 B2
(45) Date of Patent: Jan. 13, 2009

(54) BUSINESS TO BUSINESS EVENT COMMUNICATIONS

(75) Inventors: Pablo Daniel Irassar, Markham (CA); Raymond Lee-Man Kong, Markham (CA); Koi Chong Wong, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 10/768,860

(22) Filed: Jan. 30, 2004

(65) Prior Publication Data

US 2004/0250262 A1 Dec. 9, 2004

(30) Foreign Application Priority Data

May 23, 2003 (CA) .................................. 2429762

(51) Int. Cl.
 *G06F 3/00* (2006.01)
 *G06F 9/44* (2006.01)
 *G06F 9/46* (2006.01)
 *G06F 13/00* (2006.01)

(52) U.S. Cl. .................. 719/313; 719/310; 719/311; 719/318

(58) Field of Classification Search ................. 719/318, 719/313, 310, 311
See application file for complete search history.

(56) References Cited

U.S. PATENT DOCUMENTS

| | | | | |
|---|---|---|---|---|
| 5,724,589 | A * | 3/1998 | Wold ........................... | 719/318 |
| 6,438,618 | B1 * | 8/2002 | Lortz et al. ................. | 719/318 |
| 6,748,455 | B1 * | 6/2004 | Hinson et al. ............... | 719/318 |
| 2002/0016867 | A1 * | 2/2002 | Kampe et al. ............... | 709/318 |
| 2002/0143857 | A1 * | 10/2002 | Bidarahalli et al. ......... | 709/203 |
| 2003/0050983 | A1 * | 3/2003 | Johnson ...................... | 709/206 |
| 2003/0093575 | A1 * | 5/2003 | Upton ......................... | 709/310 |

FOREIGN PATENT DOCUMENTS

EP 660231 6/1995

(Continued)

OTHER PUBLICATIONS

G. Cugola et al., "The JEDI Event-Based Infrastructure and its Application to the Development of the OPSS WFMS," *IEEE Transactions on Software Engineering*, vol. 27, No. 9, p. 827-850.

(Continued)

*Primary Examiner*—Thomas Lee
*Assistant Examiner*—Jaweed A Abbaszadeh
(74) *Attorney, Agent, or Firm*—Joseph E. Bracken; Winstead, P.C.

(57) ABSTRACT

A method for the implementation of business to business event handling mechanisms for use in coarse grain components allowing communication of event information among providers and interested subscribers across a network. Provision of a flexible method for resolution of business event model dependencies allows a business component to define its own business event model independently and further may also allow changes to that model. This provision may be used to allow a client without an event handling server to place a dependency on another business component for the provision of event handling services. Further, using a web services architecture network implementation for communications, provides the capability of a business event handling system as a web service.

7 Claims, 15 Drawing Sheets

FOREIGN PATENT DOCUMENTS

| | | |
|---|---|---|
| GB | 2354349 A | 3/2001 |
| WO | WO 200062226 | 10/2000 |

OTHER PUBLICATIONS

D. Zhou et al., "JECHO-Interactive High Performance Computing with Java Event Channels," Proceedings 15 th International Parallel and Distributed Processing Symposium, 2001.

F. Fabret et al., "Filtering Algorithms and Implementation for Very Fast Systems," *SIGMOD Record Conference*, vol. 30, No. 2, pp. 115-126.

D. Garlan et al., "Model Checking Implicit-Invocation Systems," Tenth International Workshop on Software Specification and Design, Nov. 5-7, 2000.

P. Barnes, "Implementation of Observer Pattern," *C/C++ Users Journal*, vol. 18, No. 7, pp. 50, 52, 54, Jul. 2000.

"Subscription Service Infrastructure," Research Disclosure, International Business Machines Corporation 428119, Dec. 1999, 1 p.

"Using a Pub/Sub Engine as Event Server in a Workflow Management System," Research Disclosure, International Business Machines Corporation 450112, Oct. 2001, pp. 1750-1751.

Venu Vasudevan, "A Web Service Primer," available via the Internet at http://www.xml.com/pub/a/2001/04/04/webservices/index.html, Apr. 4, 2001, 3 pp.

G. Cugola et al., "The JEDI Event-Based Infrastructure and its Application to the Development of the OPSS WFMS," *IEEE Transactions on Software Engineering*, vol. 27, No. 9, Sep. 2001, pp. 827-850.

F. Fabret et al., "Filtering Algorithms and Implementation for Very Fast Systems," *SIGMOD Record Conference*, vol. 30, No. 2, Jun. 2001, pp. 115-126.

\* cited by examiner

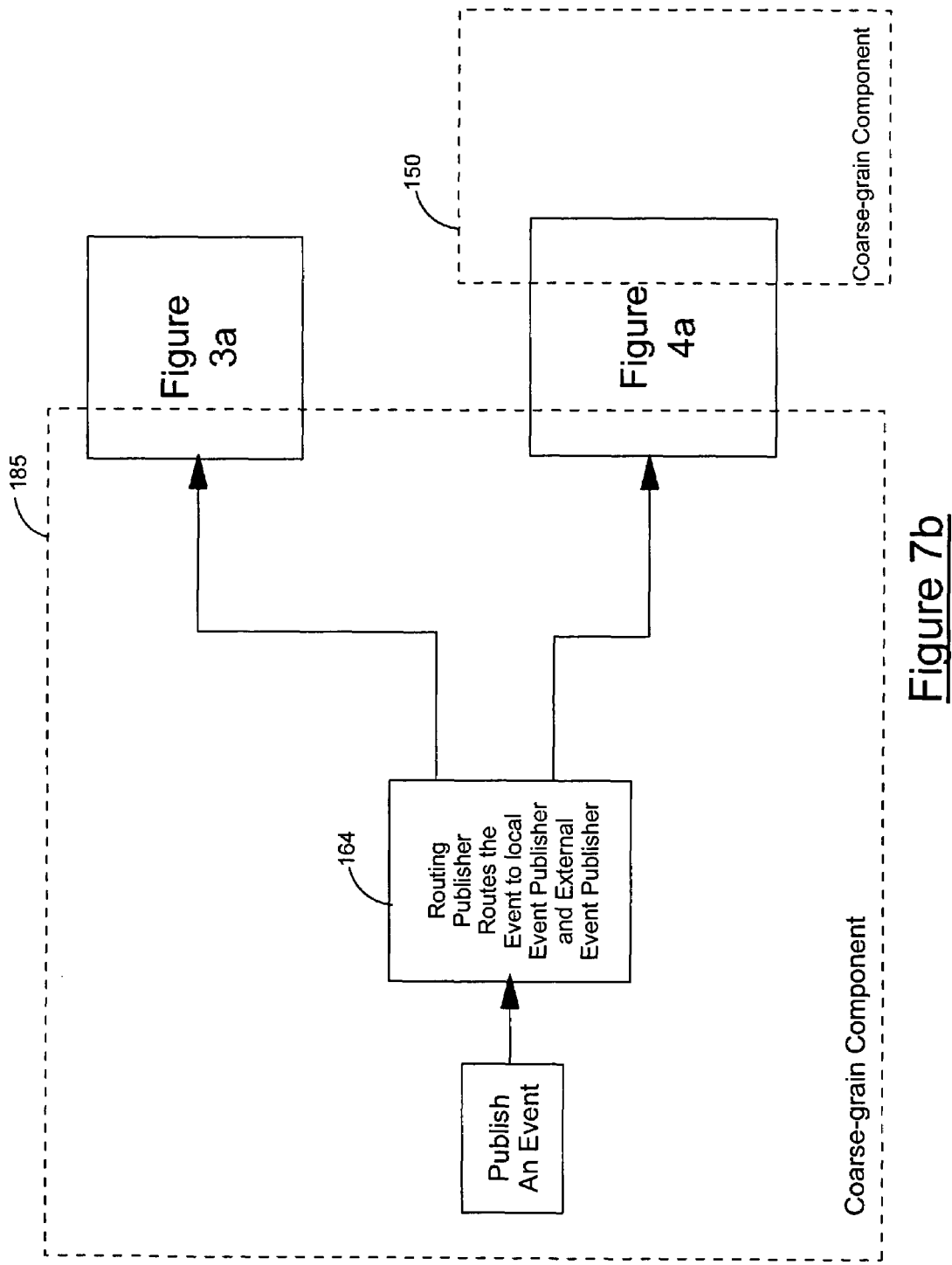

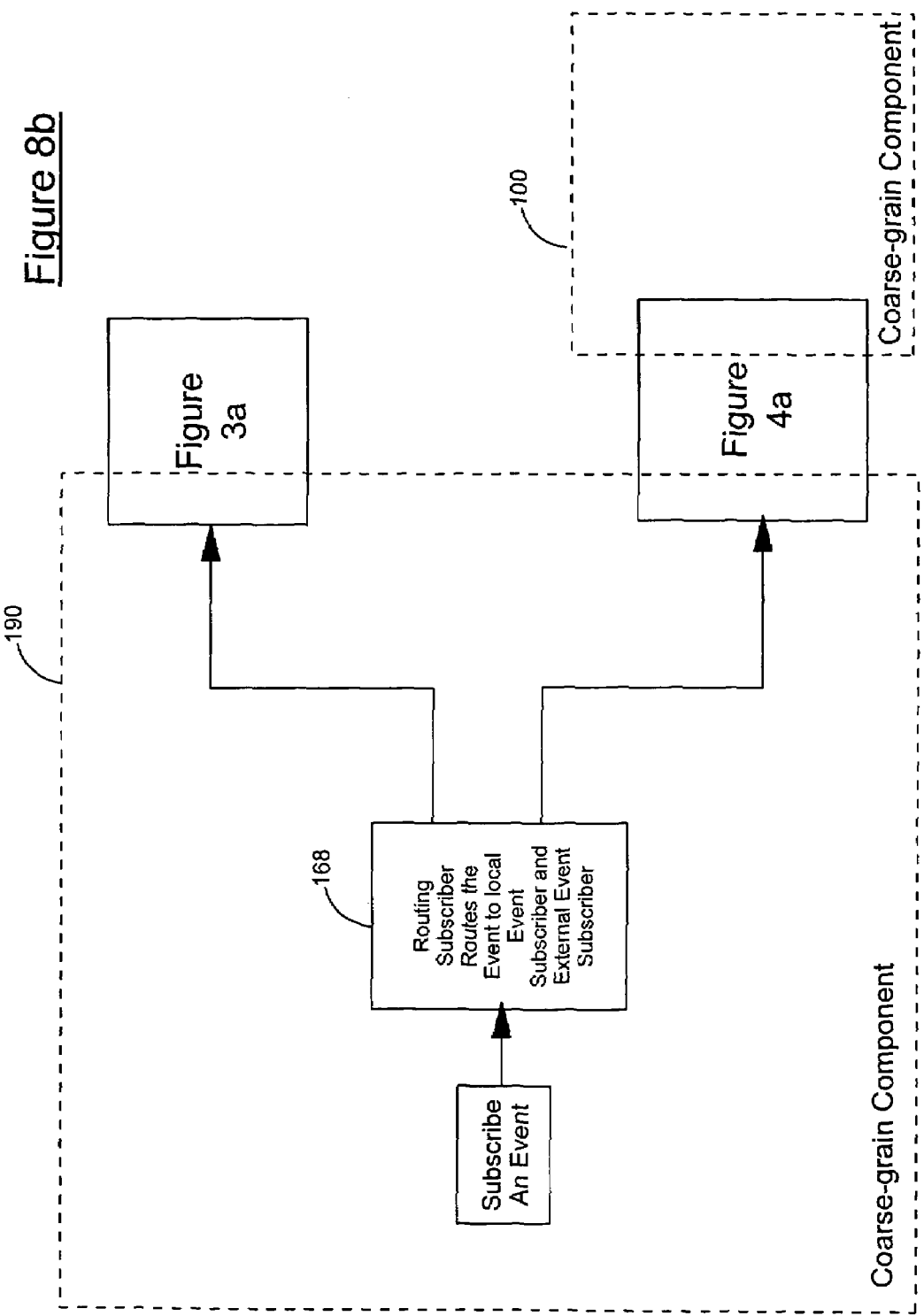

BUSINESS TO BUSINESS EVENT COMMUNICATIONS

PRIORITY BENEFIT AND CROSS REFERENCE TO RELATED APPLICATIONS

This application claims priority under 35 U.S.C. §119(a) to Canadian Patent Application No. 2,429,762 filed May 23, 2003, which is hereby incorporated herein by reference in its entirety.

TECHNICAL FIELD

This present invention relates generally to the handling of events in a computer resource, and more particularly to communicating business to business events between a provider and a subscriber across a network.

BACKGROUND INFORMATION

In the complex environment of distributed systems there is a demand for infrastructures which support the notion of events. These infrastructures support the interaction of distributed software components through the creation and exploitation of events. An event is an occurrence of a change of state in a component of the software system, typically an application related incident such as an account balance change in a financial software application. The change in state is made known to other components other than the account balance component of the financial application. Other components become aware of such events by declaring an interest of being informed of such events. Asynchronous notification is sent from a notification mechanism to all such interested components. A business event may then be described as any significant business occurrence that happens asynchronously and instantaneously in a coarse-grain business component. A coarse-grain business component is a large scale business function unit that could be used to compose an information system. A coarse-grain business component is defined as an architectural abstraction and a coherent package of software implementation having properties such as being able to be independently specified, developed, delivered, and installed; having explicit and well specified interfaces for the services it provides; having explicit and well specified interfaces for the services it expects from other components; ensuring a complete separation between its specification (contract) and its implementation; allowing access to data and behavior only through provided interfaces, and being subject to third party composition.

The coarse-grain business component in which the event occurred expects other components within the software system to have an interest in the business event and might, as a result, propagate a response. This interaction is known as publish and subscribe because of the manner in which the event is made known. The component, or surrogate thereof, in which the event originated makes known or publishes (to any component which may be interested) the fact that the event occurred. The other components, which have made known an interest in such events, subscribe to notification of such events, then listen for news of event occurrences.

Extensive business value has been realized in the provision of mechanisms able to publish and subscribe to events so that a response may be made instantaneously. Currently, implementations manage business events occurring within the components inside a single business entity. This leads to difficulty in providing end-to-end solutions to handle a business event for distributed coarse-grain components where the business components could be located in different business entities. In other words, the coarse-grain components operate on different runtime systems that might use different mechanisms.

To handle such a business event, especially for an enterprise e-business application, a typical approach has been to use third-party event handling server mechanisms for publishing or subscribing an event using the publish/subscribe model or sink/source model. To follow the event server mechanism, publishing a business event requires formation of the business event using either object-based or message-based technology. Subscribing to a business event requires the handling of asynchronous responses from the event handling server. Typically, a centralized event handling server would be used. The event handling server could be developed based on technology such as Message Queue (MQ) server, or Java Message Services (JMS) server. Then, when in the business-to-business environment, if two business components in two different business entities want to publish or subscribe to a business event they would share the same event handling server. Otherwise, two event handling servers, able to communicate with each other, would be required along with the need to share, replicate, or synchronize events between the two individual event handling servers. For components in different business entities these approaches have proven to be not very pragmatic because of the difficulty in attaining and maintaining an agreeable uniform homogenous event handling system as additional components are added to the communication of event information.

SUMMARY OF THE INVENTION

The foregoing has outlined rather broadly the features and technical advantages of the present invention in order that the detailed description of the invention that follows may be better understood. Additional features and advantages of the invention will be described hereinafter which form the subject of the claims of the invention.

It would therefore be highly desirable to have a means allowing distributed applications and their components to effectively communicate event information across a network among interested components.

In one embodiment of the present invention, a method for communicating an event over a network between a provider and a subscriber comprises the step of registering the event with an event server. Further, the method comprises registering the subscriber with the event server as an event listener in the first document, where the first document is an event listener deployment descriptor. Additionally, the method comprises creating a descriptor of the event. Further, the method comprises publishing the descriptor in a second document. In addition, the method comprises providing notification of the event to a first intermediary by the provider. Furthermore, the method comprises sending the notification to the event listener in accordance with the event descriptor in the second document. Further, the method comprises locating the subscriber in the first document in response to receiving notification on the event server. Additionally, the method comprises transforming the notification into a common form, where the first intermediary uses a SOAP-JMS form as the common form. Furthermore, the method comprises transforming the common form into an event server form. Further, the method comprises making the event server form of the notification available to the subscriber. The step of registering the subscriber with the event server further comprises receiving a registration request from the subscriber at the first intermediary in the common form. Additionally, the step of registering the subscriber with the event server comprises transforming the common form into the event server form by the first intermediary and sending the request to the event server. Furthermore, the step of registering the subscriber with the event server comprises responsive to the request, publishing the descriptor from the second document by the event server. The notification is sent to the first intermediary passing notification to the second intermediary, the second intermediary locating the descriptor for a predetermined event listener in the first document and sending the event notification to the event listener in accordance with the descriptor found in the first document. The step of publishing further comnrises invoking a publish request through one of the first and the second intermediary. Further, the step of publishing comprises responsive to the publish request, the one of the first and the second intermediary directing the request to a predetermined event server. Additionally, the step of publishing comprises responsive to the request the event server publishing the event.

The technique may be employed across a variety of applications, reducing the limitation of a fixed business event model when implementing a business component. A business component is allowed to define its own business event model independently and may also change that model, if necessary, at a later date.

Further advantage may be obtained through provision of a flexible method for resolution of business event model dependencies. This may be used to allow a client (or some other business component) not having its own event handling server to place a dependency on a business component owning an event handling server for the provision of event handling services.

Additional advantage may be obtained using a web service architecture network implementation for communications to provide a business event handling system as a web service.

Other aspects and features of the present invention will become apparent to those of ordinary skill in the art upon review of the following description of specific embodiments of the invention in conjunction with the accompanying figures.

BRIEF DESCRIPTION OF THE DRAWINGS

For a more complete understanding of the present invention, and the advantages thereof, reference is now made to the following descriptions taken in conjunction with the accompanying drawings, in which:

FIG. 2b is a flow diagram of activities performed by the publishing business event mechanism of FIG. 2a;

FIG. 3b is a flow diagram of activities performed by the subscribing business event mechanism of FIG. 3a;

FIG. 4b is a flow diagram of activities performed in the subscribing business event to coarse grain component example of FIG. 4a;

FIG. 5b is a flow diagram of activities performed in the publishing business event to coarse grain component example of FIG. 5a;

FIG. 7b illustrates publishing to a multiple event handling server used on the network of FIG. 1;

FIG. 8b illustrates subscribing from a multiple event handling server used on the network of FIG. 1.

DETAILED DESCRIPTION

Figure 1:
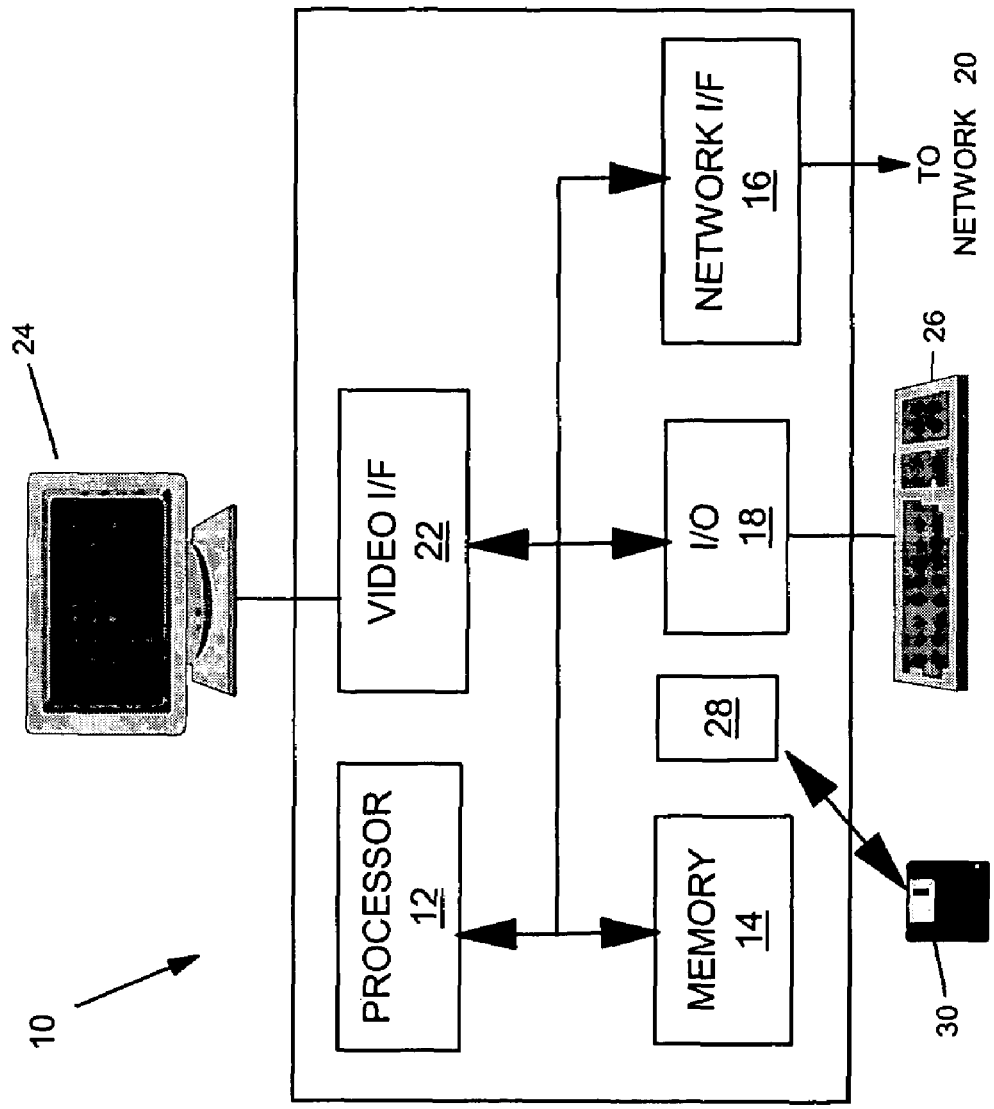
FIG. 1 is a hardware overview of a computer system, exemplary of embodiments of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Simplified hardware architecture of an example computing device 10 is schematically illustrated in FIG. 1. In the illustrated embodiment, device 10 is also capable of being a conventional network capable server. Device 10 could, for example, be an Intel x86 based computer acting as a Microsoft Windows NT, Apple, or Unix based server, workstation, personal computer or the like. Example device 10 includes a processor 12, in communication with computer storage memory 14, network interface 16, input output interface 18, and video adapter 22. As well, device 10 may optionally include a display 24 interconnected with adapter 22, input/output devices, such as a keyboard 26 and disk drive 28 and a mouse (not shown) or the like. Processor 12 is typically a conventional central processing unit, and may for example be a microprocessor in the INTEL x86 family. Of course, processor 12 could be any other suitable processor known to those skilled in the art. Computer storage memory 14 includes a suitable combination of random access memory, read-only-memory, and disk storage memory used by device 12 to store and execute software programs adapting device 12 to function in manners exemplary of the present invention. Drive 28 is capable of reading and writing data to or from a computer readable medium 30 used to store software and data to be loaded into memory 14. Computer readable medium 30 may be a CD-ROM, diskette, tape, ROM-Cartridge or the like. Network interface 26 is any interface suitable to physically link device 10 to network 20. Interface 26 may, for example, be an Ethernet, ATM, ISDN interface or modem that may be used to pass data from and to network 20 or another suitable communications network.

The hardware architectures of computing devices presumed to be used by way of examples, individually or networked together, are materially similar to that of device 10, and will therefore not be further detailed.

In an embodiment of the invention, there is a server for the handling of events. This server is known as an event server and may be implemented as a Java Message Server typically contained within a coarse-grain business component. Additionally, in conjunction with the JMS server is a Simple Object Access Protocol (SOAP)-JMS Architecture component. The SOAP-JMS Architecture component acts as a first intermediary between the JMS server and other components desiring communication with the JMS server. As an intermediary, the SOAP-JMS Architecture component provides bridging services wherein data of a JMS event server specific form can be transformed into an application specific form and back again. The SOAP-JMS Architecture can be viewed as a pivot service using a common to provide transformation services between the unique requirements of the application and the unique requirements of the JMS event server forms of data. For example, the SOAP-JMS Architecture provides isolation from the JMS server for application components acting as publishing or subscribing clients of the JMS server. Additionally, the transforms allow the JMS server to support a wider variety of clients more efficiently by using the SOAP-JMS Architecture interface and transform services.

Web service architecture network implementation is also introduced as a second intermediary supporting the same IP communication protocol as the SOAP-JMS Architecture component. The web service architecture network implementation supports both XML and HTTP allowing components of complex composite services to communicate even if they have differing implementations. The generic web service architecture network implementation provides another interface layer to manage differences between applications and components that need to communicate to provide some added value in a typical business activity. The web service architecture component provides transformation services for clients involved in typical specialized or complex interactions and additionally allowing efficiency in location of resources. The web services architecture using an IP based web communication protocol of HTTP provides a layer of support for programmatic access to services which may then be implemented by other kinds of middleware products or applications.

Applications exploiting web services may choose to use Web Services Description Language (WSDL) to more efficiently describe their expectations regarding services wanted or provided.

Event notification is designed to signal asynchronous occurrences to other tasks that may be interested, without an implied notion of cooperation between the tasks. If there is no task listening for an event, the event passes unheeded. A task that acts as a provider, creates and publishes an event, is not affected by the presence or absence of subscribers.

Clients acting as providers create events when they have an occurrence to announce. They then create an event publisher to publish the event. Clients may also subscribe to events that meet selection criteria. Events have attributes or descriptors assigned when they are created describing characteristics such as an event name uniquely identifying the subject of the event, a module or component name of the event's origination, or perhaps a module type describing a module that published the relevant event. In order to allow all publishers and subscribers to use events independently, all event names are registered with a registration authority before the event is published or distributed. Event attributes or descriptors need to be defined in advance to allow publishers and subscribers to make consistent reference to such information when publishing or subscribing to events.

SOAP provides a simple and lightweight mechanism for exchanging structured and typed information between peers in a decentralized, distributed environment using XML. SOAP does not itself define any application semantics such as a programming model or implementation specific semantics; rather it defines a simple mechanism for expressing application semantics by providing a modular packaging model and encoding mechanisms for encoding data within modules. This allows SOAP to be used in a large variety of systems ranging from messaging systems to RPC.

SOAP consists of three parts:
1. An envelope construct that defines an overall framework for expressing what is in a message, who should deal with it, and whether it is optional or mandatory.
2. Encoding rules that define a serialization mechanism that can be used to exchange instances of application-defined data types.
3. An RPC representation that defines a convention that can be used to represent remote procedure calls and responses.

More information on SOAP may be found in Simple Object Access Protocol (SOAP) 1.1, W3C Note 8 May 2000, located at: http://www.w3.org/TR/2000/NOTE-SOAP-20000508. For the latest version check: http://www.w3.org/TR/SOAP.

A number of exemplary scenarios are presented next to show the how the problems suggested earlier may be resolved through the use of features of the invention.

Figure 2A:
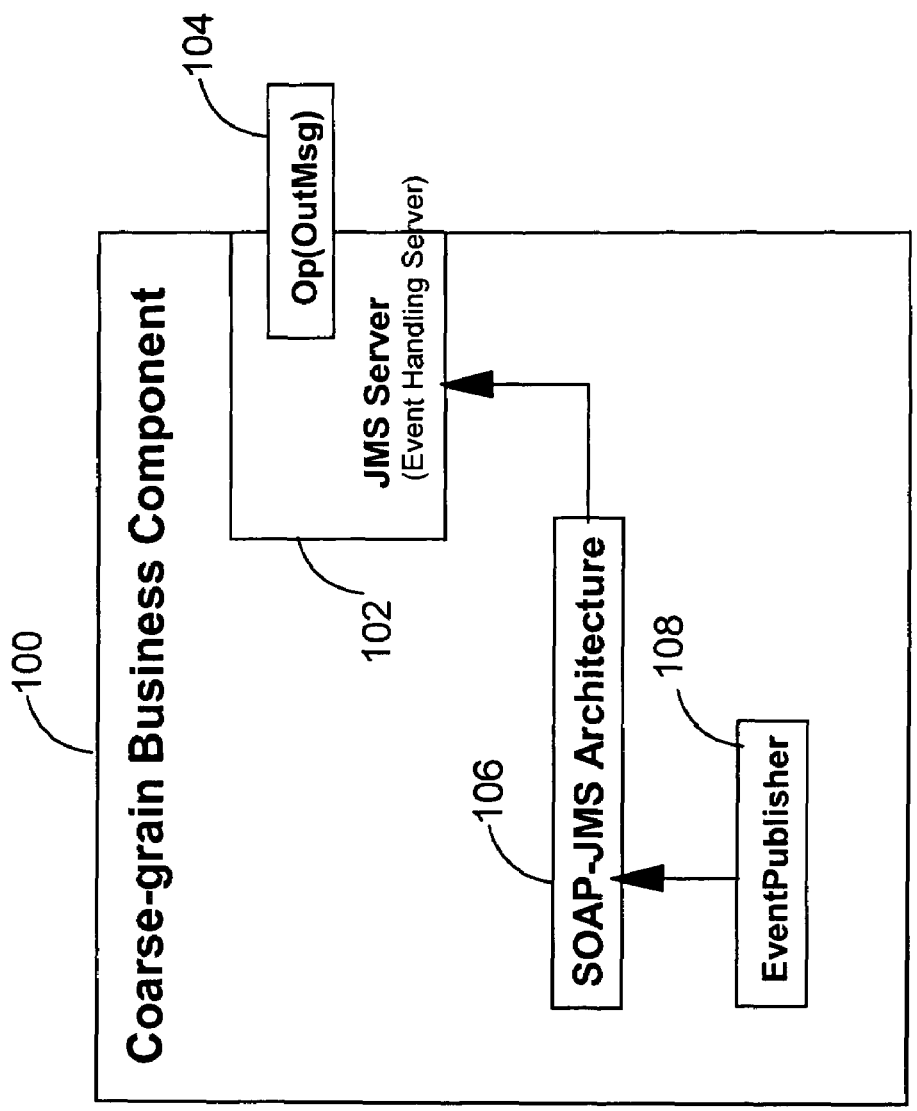
FIG. 2a illustrates an exemplary embodiment of a publishing business event mechanism of the present invention of FIG. 1.

FIG. 2a schematically illustrates exemplary functional components of a coarse-grain business component stored at the computing device illustrated in FIG. 1, as used in an event publish activity.

Computing device 10 stores and executes component software as shown in FIG. 2a to create an event related message. The business entity is coarse-grain business component 100 comprising a Java Message Service server (JMS event server) 102 in communication with a Simple Object Access Protocol-Java Message Service (SOAP-JMS) Architecture 106 component. SOAP provides a protocol specification defining a uniform or common form way of passing data encoded using XML, and allowing remote invocation of services using HTTP as the underlying protocol. SOAP-JMS Architecture 106 acting as a first intermediary provides an interface isolating EventPublisher 108 from JMS server 102. As will become apparent, an event, initiated from activity by EventPublisher 108 is caused to be made available on JMS server 102 in event server form of an event message Op(OutMsg) 104.

Figure 2B:
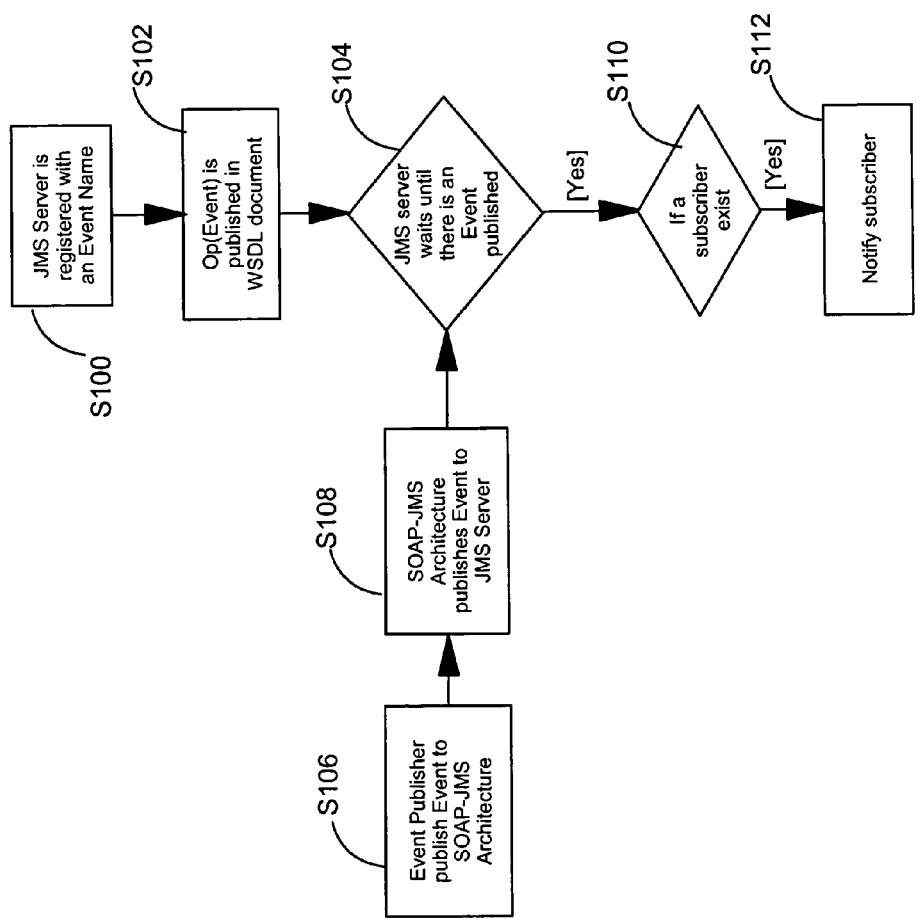

Exemplary functional components of coarse-grain business component 100 of FIG. 2a are further detailed in FIG. 2b. As illustrated, in S100, an event name is registered with JMS server 102. Then in S102 an event, Op(Event), is published in a Web Services Description Language (WSDL) document that describes where a Web service is deployed and what operations that service provides such as those used in IBM WebSphere Studio Application Developer. WSDL is a joint effort of IBM and Microsoft to provide an XML based description language for describing web services, thereby providing an expression of services to potential users. The WSDL document provides a set of definitions comprising service, port, message, bindings, and port type. WSDL provides default values to ensure names are unique. In S104, JMS server 102 waits for an indication that an event published. An event is then published in S106 by EventPublisher 108 publishing to SOAP-JMS Architecture 106, wherein then in S108 SOAP-JMS Architecture publishes the new event to JMS server 102. EventPublisher 108 does not need to know the particular formats of JMS server 102. An event having been published and received causes a determination to be made in S110 for existence of a subscriber for the published event. If a subscriber exists, a notification is sent out in S112 from JMS server 102 in the form of message Op(OutMsg) 104 of FIG. 2a.

Figure 3A:
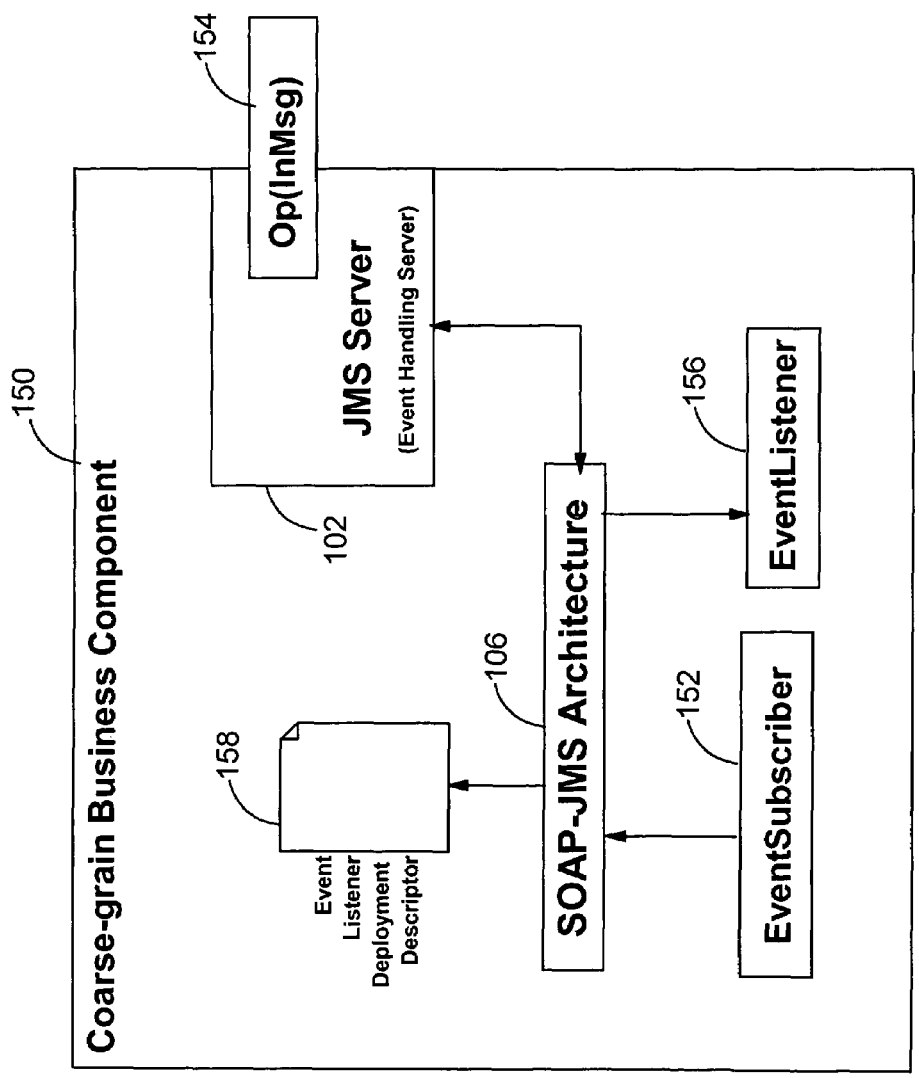
FIG. 3a illustrates an exemplary embodiment of a subscribing business event mechanism of the present invention of FIG. 1.

FIG. 3a schematically illustrates exemplary functional components of a coarse-grain business component stored at the computing device illustrated in FIG. 1 used in an event subscribe activity.

Computing device 10 stores and executes component software as shown in FIG. 3a to create a request for event notification message. The business entity is coarse-grain business component 100, as before in FIG. 2a comprising a Java Message Service server (JMS server) 102 in communication with a SOAP-JMS Architecture 106 component. SOAP-JMS Architecture 106 provides an interface isolating EventSubscriber 152 and EventListener 156 from JMS server 102. As will become apparent, an event notification request, initiated from activity by EventSubscriber 152 for EventListener 156 is caused to be made available on JMS server 102 in the form of an event message Op(InMsg) 154. EventListenerDeploymentDescriptor 158, an XML document providing information at runtime about services that should be available to a client, is used as a resource by SOAP-JMS Architecture 106.

Figure 3B:
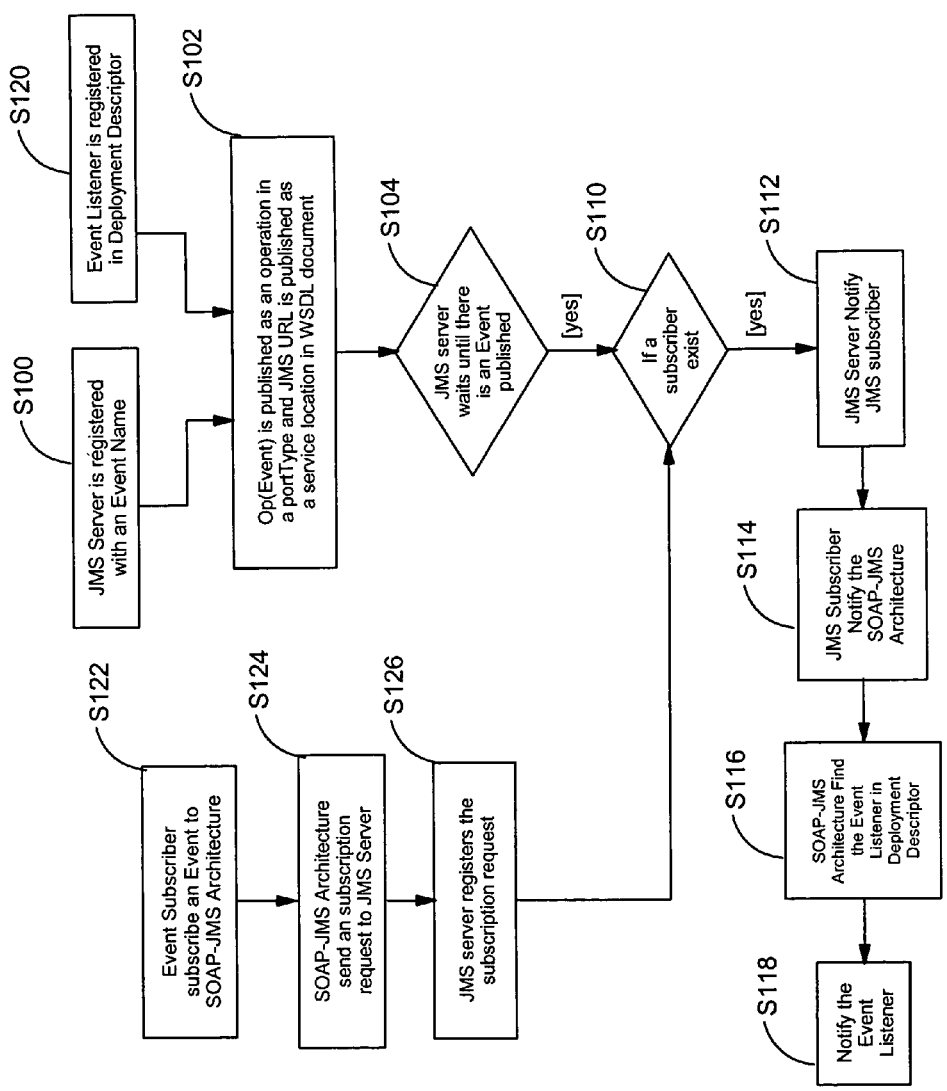

FIG. 3b further illustrates exemplary function of the components of coarse-grain business component 100 of FIG. 3a. As illustrated, in S100, an event name is registered with JMS server 102. In addition in S120, an event listener is also registered in an EventListenerDeploymentDescriptor 158. As before in S102 an event, Op(Event) is published as an operation in a portType and a JMS universal resource locator (URL) is published as a service location in a WSDL document that describes where a Web service is deployed and what operations that service provides. In S104, JMS server 102 waits as before in FIG. 2b, until there is an event published and to receive notification. An event subscriber subscribes in S122, to SOAP-JMS Architecture 106 where in S124 the subscription request is then sent to JMS server 102. In S126, JMS server 102 registers the subscription request. A subscription having been received by JMS server 102 causes a determination to be made in S110 to see if a subscriber exists for the event. If a subscriber exists, a notification is initiated in S112 by JMS server 102 for notification of JMS subscriber. The notification from S112 is received by SOAP-JMS Architecture 106 in S114. Having received notification, now in S116 SOAP-JMS Architecture 106 finds the event listener in the deployment descriptor. Finally the notification is passed to the event listener in S118.

Figure 4A:
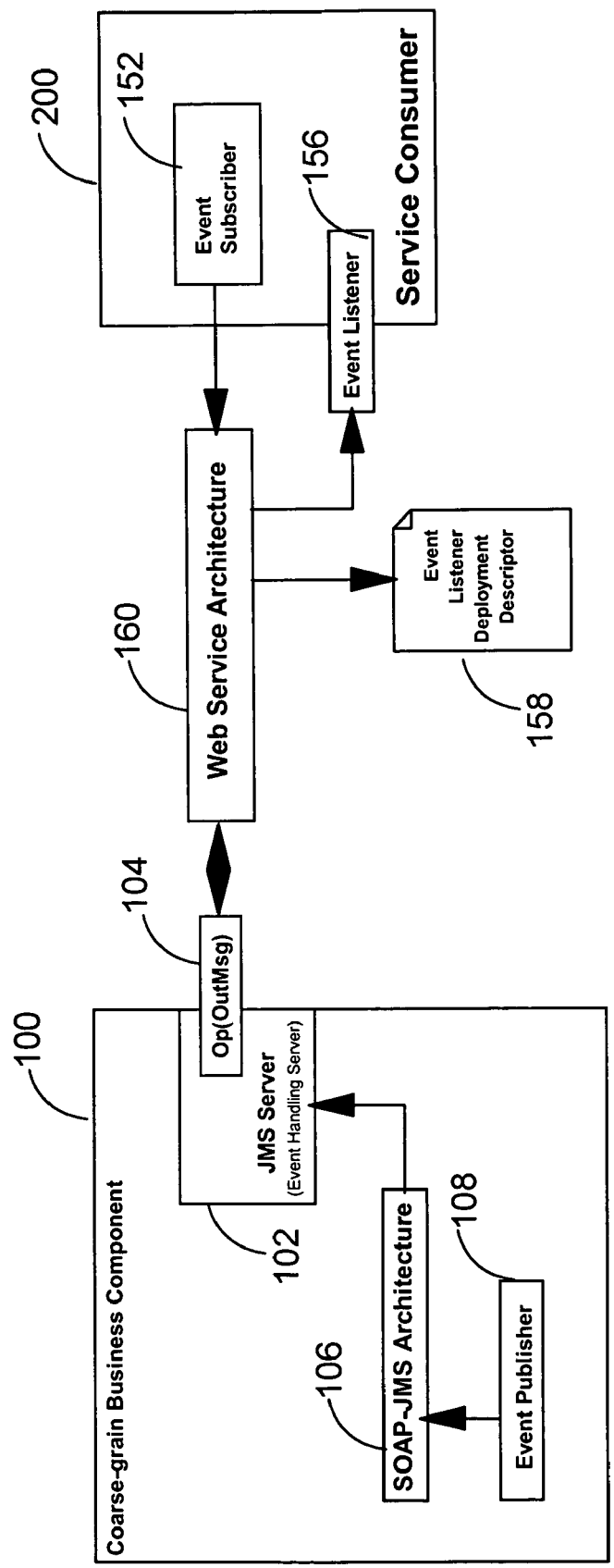
FIG. 4a illustrates a subscribing business event to coarse grain component example used on the network of FIG. 1.

Referring to FIG. 4a is illustrated a subscribing business event to coarse grain component example used on the network of FIG. 1, exemplary of an embodiment of the invention. As in FIG. 2a, computing device 10 stores and executes component software to create an event related message. The business entity is coarse-grain business component 100 comprising a Java Message Service server (JMS server) 102 in communication with a SOAP-JMS Architecture 106 component. SOAP-JMS Architecture 106 provides an interface isolating EventPublisher 108 from JMS server 102. As will become apparent, an event, initiated from activity by EventPublisher 108 is caused to be made available on JMS server 102 in the form of an event message Op(OutMsg) 104. In this example Event Subscriber 152 is located on another system, Service Consumer 200, communicating via Web Service Architecture 160. Web Service Architecture 160 provides a black box style of function that provides for reuse without regard to how the service was implemented. Such services require only use of web based protocols such as HTTP and XML. The interface is defined in terms of messages accepted and generated as a web service rather than in a object specific protocol. Additionally EventListenerDeploymentDescriptor 158 is now associated with Web Service Architecture 160 as a resource to aid in determination of location and services needs of Event Subscriber 152. Event Listener 156 is also located on Service Consumer 200, communicating via Web Service Architecture 160 as a second intermediary. Service Consumer 200 can be any programmatic unit that interacts with the coarse grain business component and it does not have the larger responsibilities associated with a coarse grain business component. An example of programmatic unit could be an applet or simple program (such as an atomic single purpose agent listening for information used to trigger an action).

Figure 4B:
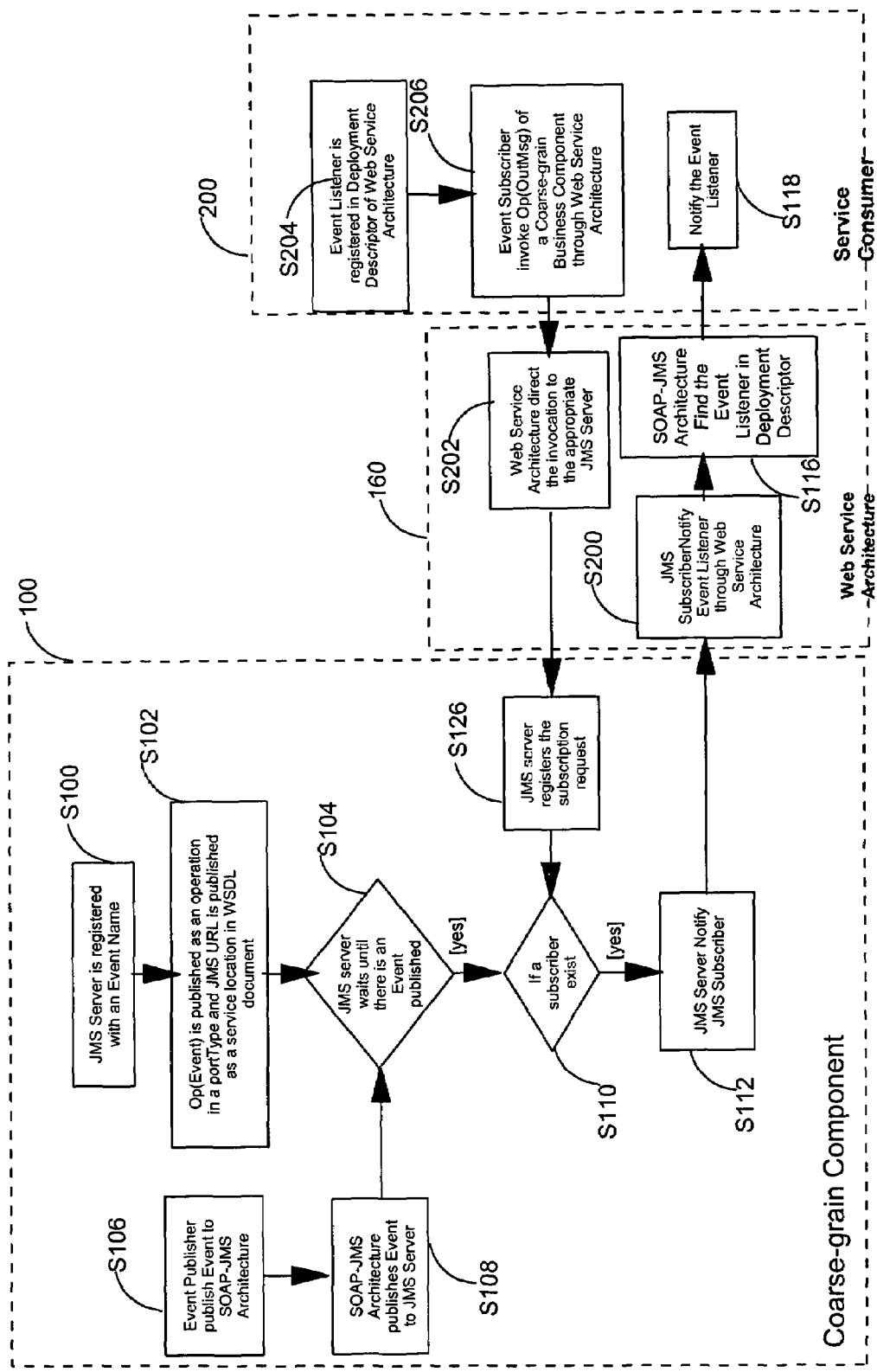

Exemplary function of components comprising coarse-grain business component 100 of FIG. 2a are found again in FIG. 4b. As illustrated, in S100, an event name is registered with JMS server 102. Then in S102 an event, Op(Event) is published as an operation in a port Type and JMS URL is published as a service location in a WSDL document that describes where a Web service is deployed and what operations that service provides such as those used in IBM WebSphere Studio Application Developer. The document provides a set of descriptors or definitions that consist of service, port, message, bindings, and port type. WSDL provides default values to ensure names are unique. In S104, JMS server 102 waits until there is an event published. An event is published in S106 by EventPublisher 108 publishing to interfaces of SOAP-JMS Architecture 106, wherein then in S108 SOAP-JMS Architecture 106 publishes the new event to JMS server 102. An event having been published and received causes a determination to be made in S110 for existence of a subscriber for the published event. If a subscriber exists, a JMS server notification is sent out in S112 from JMS server 102 to JMS subscriber in the form of message Op(OutMsg) 104.

Within Service Consumer 200 is performed S204 wherein an event listener is registered in the deployment descriptor of Web Service Architecture 160. Thereafter, during S206, the event subscriber invokes an Op(OutMsg) of a coarse-grain business component through Web Service Architecture 160. Upon receiving the invocation in S202, Web Service Architecture 160 passes the invocation to the appropriate JMS server.

Receiving an invocation request in S126, JMS server 102 of coarse-grain business component 100 registers the subscription request.

The JMS server notification to JMS subscriber of S112 is received through Web Service Architecture in S200 for the JMS subscriber notify event listener. The notification message received is passed in S116 to SOAP-JMS Architecture to find the event listener in the deployment descriptor. Upon finding the event listener, notification is forwarded in S118 to the actual event listener.

Figure 5A:
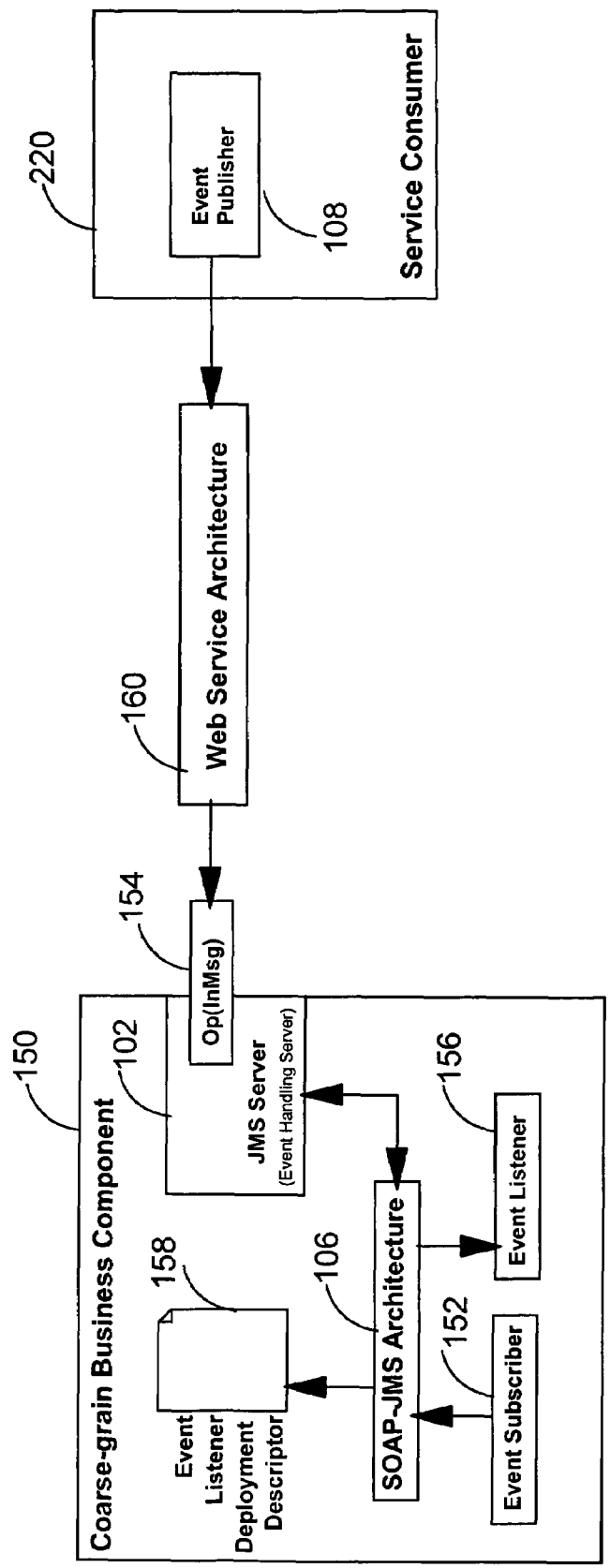
FIG. 5a illustrates a publishing business event to coarse grain component example used on the network of FIG. 1.

Referring now to FIG. 5a is illustrated a publishing business event to coarse grain component example as used on the network of FIG. 1, exemplary of an embodiment of the invention. As before in FIG. 3a computing device 10 stores and executes component software as shown to create a request for event notification message. The business entity is coarse-grain business component 150 comprising a Java Message Service server (JMS server) 102 in communication with a SOAP-JMS Architecture 106 component. SOAP-JMS Architecture 106 provides an interface isolating EventSubscriber 152 and EventListener 156 from JMS server 102. As will become apparent, an event notification request, initiated from activity by EventSubscriber 152 for EventListener 156 is caused to be made available on JMS server 102 in the form of an event message Op(InMsg) 154. EventListenerDeploymentDescriptor 158, an XML document providing information at runtime about services that should be available to a client, is used as a resource by SOAP-JMS Architecture 106.

As can be seen, there is additionally a remote Service Consumer 220 having an Event Publisher 108 located thereon. Event Publisher 108 communicates with JMS server 102 via Web Service Architecture 160.

Figure 5B:
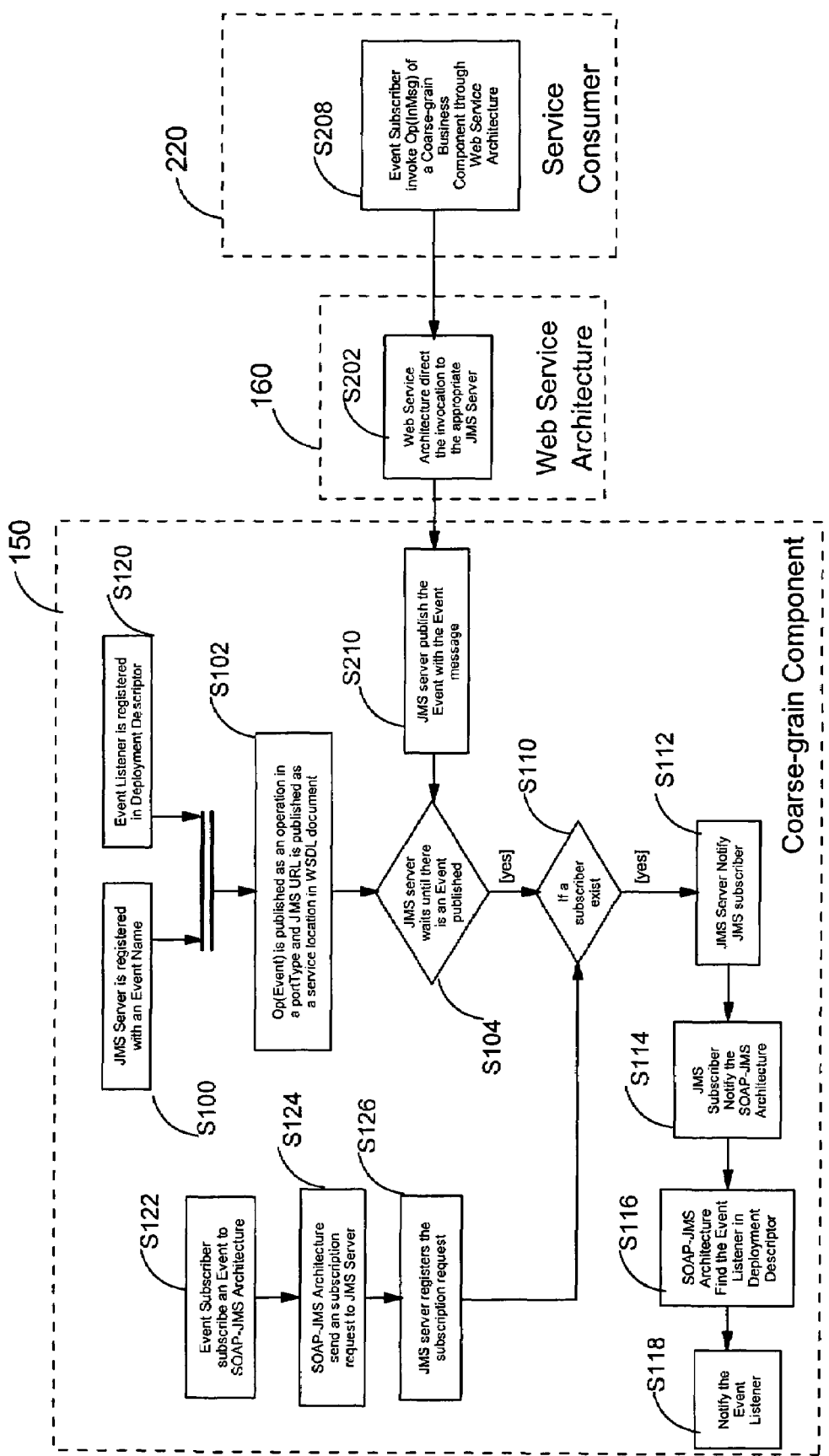

FIG. 5b further illustrates exemplary function of the components of coarse-grain business component 150 of FIG. 3a. As illustrated, in S100, JMS server 102 is registered with an event name. In addition in S120, an event listener is also registered in an EventListenerDeploymentDescriptor 158. As before in S102 an event, Op(Event) is published as an operation in a portType and a JMS universal resource locator (URL) is published as a service location in a WSDL document that describes where a Web service is deployed and what operations that service provides. In S104, JMS server 102 waits as before in FIG. 2b, until there is an event published. An event subscriber subscribes in S122, to SOAP-JMS Architecture 106 where in S124 the subscription request is then sent to JMS server 102. In S126, JMS server 102 registers the subscription request. A subscription having been received by JMS server 102 causes a determination to be made in S110 to see if a subscriber exists for the event. If a subscriber exists, a notification is initiated in S112 by JMS server 102 for notification of JMS subscriber. The notification from S112 is received by SOAP-JMS Architecture 106 in S114. Having received notification, now in S116 SOAP-JMS Architecture 106 finds the event listener in the deployment descriptor. Finally the notification is passed to the event listener in S118.

In operation S208 of Service Consumer 220, Event Publisher 108 invokes an Op(InMsg) of a coarse-grain business component directed through Web Service Architecture 160. In S202 Web Service Architecture 160 receives the invocation and directs the invocation to an appropriate JSM server.

JMS server 102 of coarse-grain business component 100, waiting for event notices now receives the invocation to publish the event with the event message in S210, passing notification to S104 for processing as previously described.

Figure 6A:
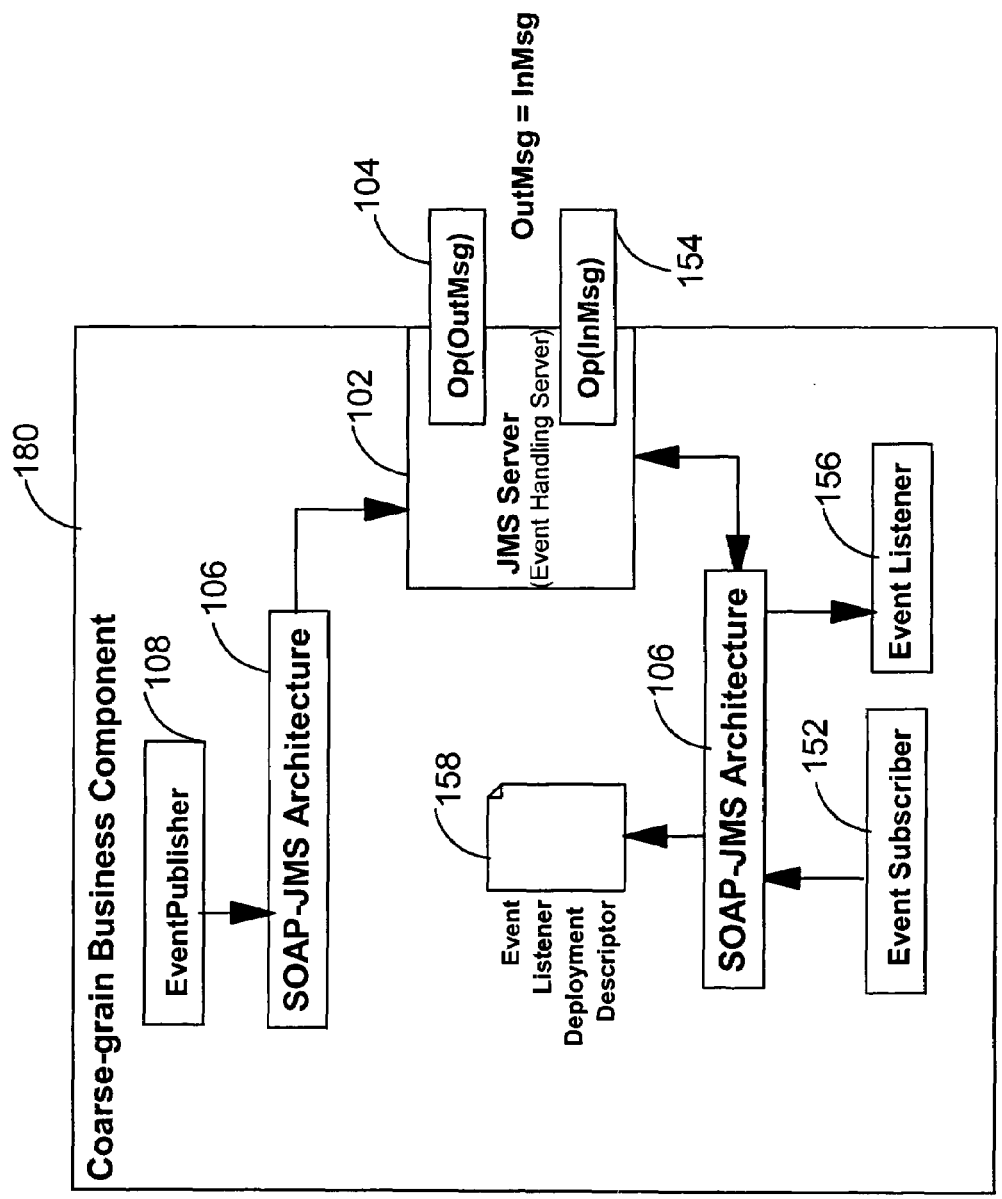
FIG. 6a illustrates, in a high level view, provision of both publishing business event and subscribing business event mechanisms in a single coarse grain component used on the network of FIG. 1.

FIG. 6a illustrates, in a high level view, provision of both publishing business event and subscribing business event mechanisms in a single coarse grain component 180 used on the network of FIG. 1. Operationally, processes will work as previously described for FIG. 1 and FIG. 2, therefore, will not be further explained here.

Figure 6B:
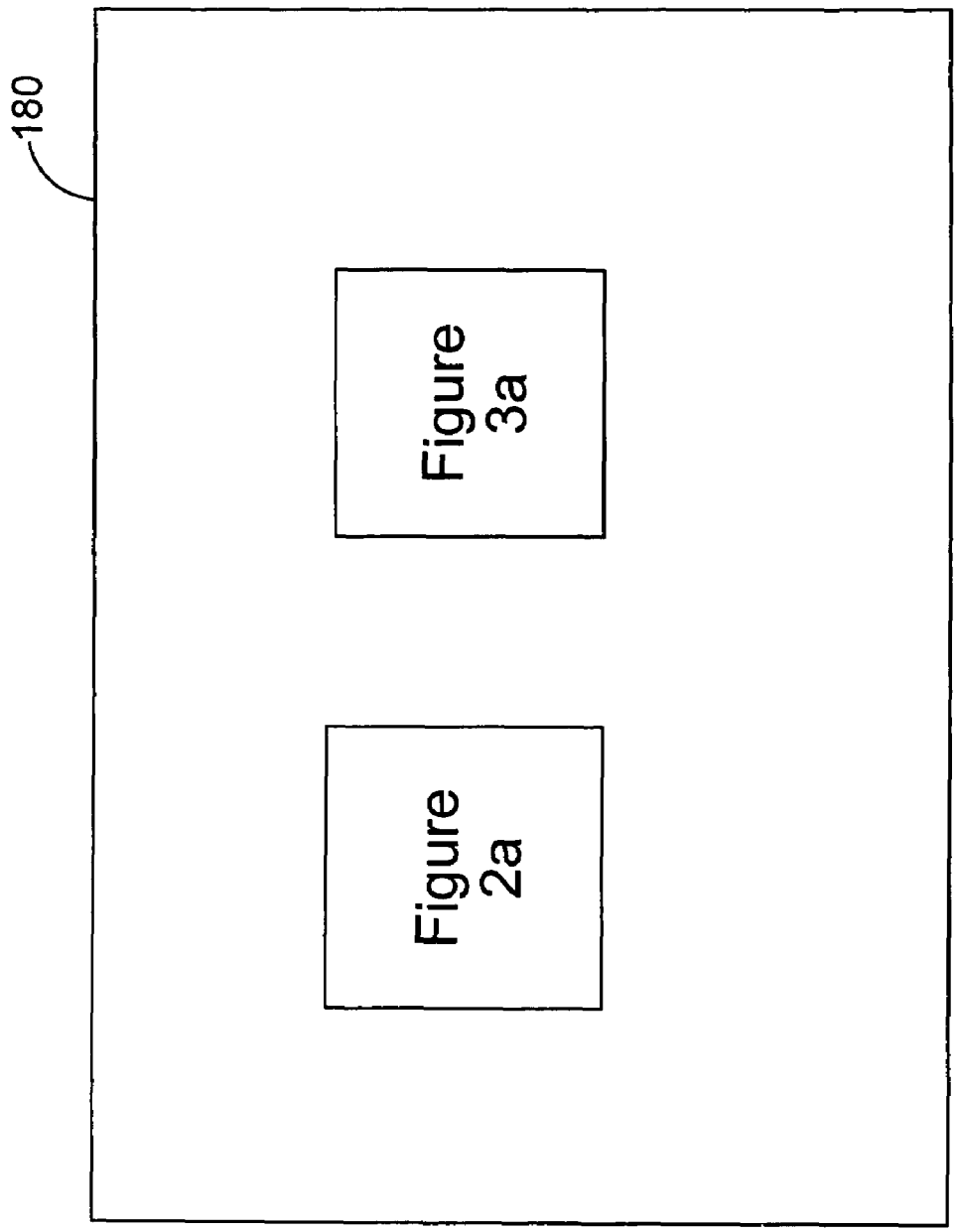
FIG. 6b illustrates provision of both publishing business event and subscribing business event mechanisms in a single coarse grain component used on the network of FIG. 1.

Referring now to FIG. 6b is an illustration of the provision of both publishing business event and subscribing business event mechanisms in a single coarse grain component 180 used on the network of FIG. 1. This may be viewed as the incorporation of both FIG. 2a and FIG. 3a within a single coarse-grain business component as exemplified in FIG. 6a. It should be noted that there is shown two SOAP-JMS Architecture instants, but it may be appreciated by those skilled in the art that a single instance of the SOAP-JMS Architecture may also be used.

Figure 7A:
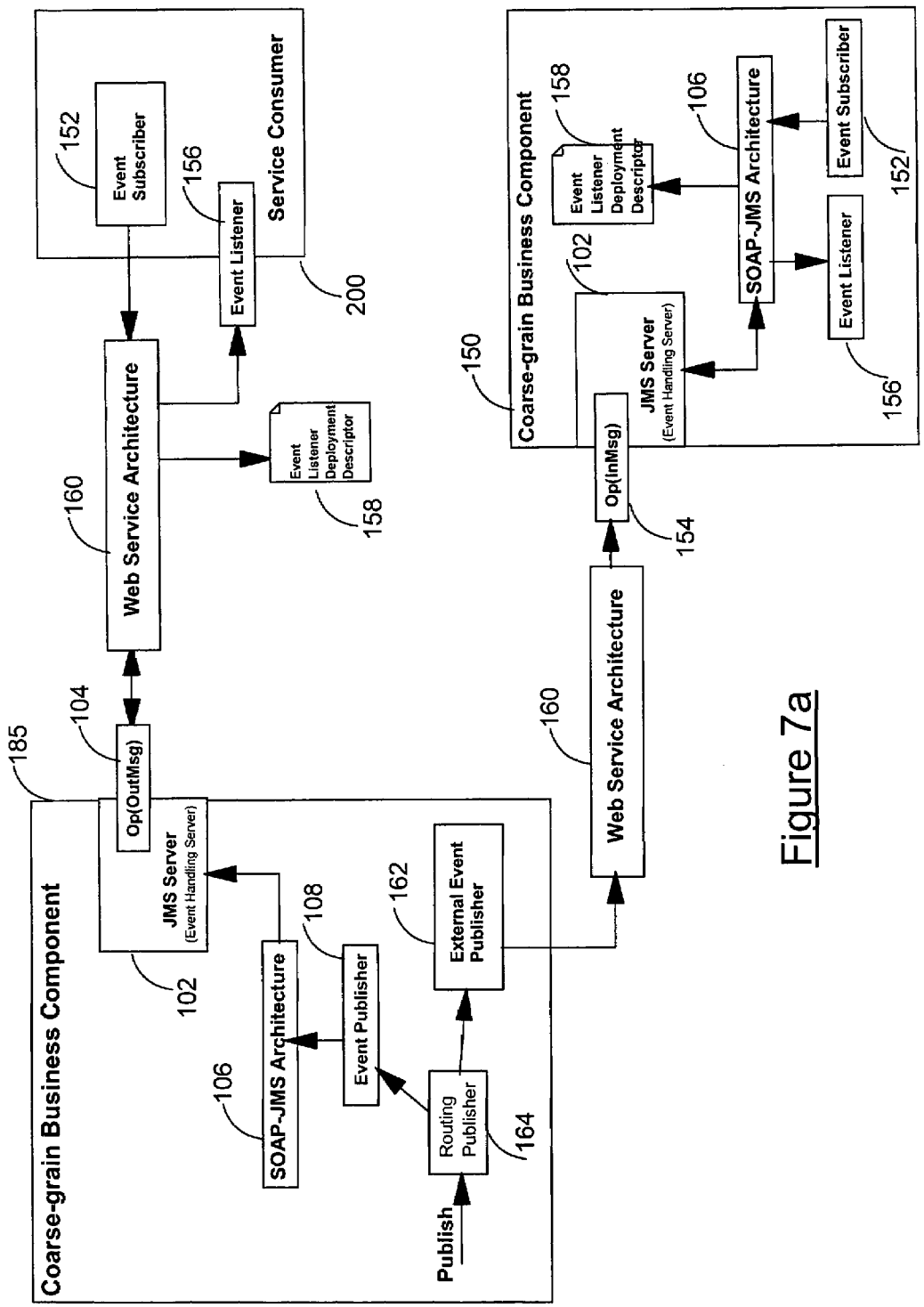
FIG. 7a illustrates, in a high level view, publishing to a multiple event handling server used on the network of FIG. 1.

FIG. 7a illustrates, in a high level view, provision of publishing a business event from one coarse-grain business component while having a subscribing business event mechanism in a single coarse grain component and a service consumer as used on the network of FIG. 1. Operationally, processes will work as previously described for FIG. 4a and FIG. 5a, with additional support provided by a routing mechanism, Routing Publisher 164 of FIG. 7b.

Referring now to FIG. 7b, illustrates an additional component within coarse-grain business component 185, that being the routing component Routing Publisher 164. Routing Publisher 164 receives event publish requests and directs such requests to either a local Event Publisher 108 or an External Event Publisher 162 or both as required.

When publishing is directed to a local JMS server 102, Event Publisher 108 is used to create an event notification request using SOAP conventions, passing the request along to a local SOAP-JMS Architecture 106. In turn, SOAP-JMS Architecture 102 transforms the event notification request into JMS event server form and passes the request along to JMS server 102 for processing. JMS server 102 creates Op(OutMsg) 104. Op(OutMsg) 104 can either be pushed out on a network through Web Service Architecture 160 or event subscribers may visit JMS server 102 looking for messages. EventSubscriber 152 registers with Web Service Architecture 160 stating its desire to receive notification of specific events. Having registered with Web Services Architecture 160, an EventListenerDeploymentDescriptor 158 entry is created for later use. Web Service Architecture 160 uses EventListenerDepolymentDescriptor 158 to determine where to find subscribers and what resources may be needed. Web Service Architecture 160 having used EventListenerDepolymentDescriptor 158 to locate the appropriate subscriber entries sends the event notification to EventListener 156.

When publishing is directed to a remote JMS server 102, External Event Publisher 162 creates an event request and relies on Web Service Architecture 160 to deliver the request to the designated JMS server. As before, the event request appears at remote JMS server 102 on remote coarse-grain business component 150 as a Op(InMsg) 154 and is processed accordingly. JMS server 102 sends the Op(InMsg) 154 to SOAP-JMS Architecture 106 where Event Subscriber 152 has registered for event notification, creating entries in an associated EventListenerDeploymentDescriptor 158. SOAP-JMS Architecture 106 uses EventListenerDepolymentDescriptor 158 to determine where to find subscribers and what resources may be needed. SOAP-JMS Architecture 106 having used EventListenerDepolymentDescriptor 158 to locate the appropriate subscriber entries sends the event notification to EventListener 156.

Figure 8A:
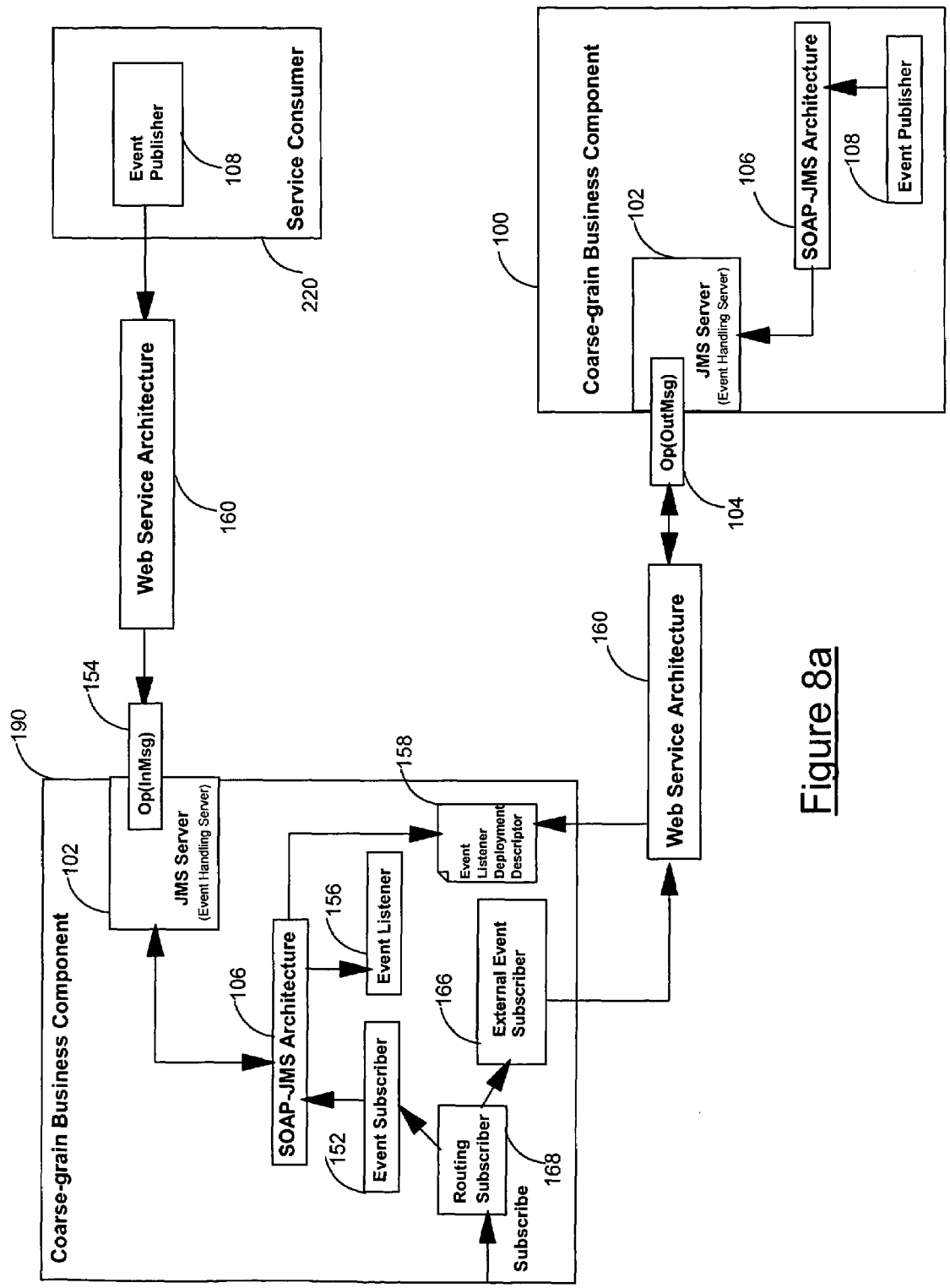
FIG. 8a illustrates, in a high level view, subscribing from a multiple event handling server used on the network of FIG. 1.

FIG. 8a illustrates, in a high level view, provision of subscribing to a business event from one coarse-grain business component while having a publishing business event mechanism in a single coarse grain component and a service consumer as used on the network of FIG. 1. Operationally, processes will work as previously described for FIG. 4a and FIG. 5a, with additional support provided by a routing mechanism, Routing Subscriber 168 of FIG. 8b.

Referring now to FIG. 8b, illustrates an additional component within coarse-grain business component 190, that being the routing component Routing Subscriber 168. Routing Subscriber 168 receives event subscribe requests and directs such requests to either a local Event Subscriber 152 or an External Event Subscriber 166 or both as required.

When publishing is directed to a local JMS server 102, Event Subscriber 152 is used to create a subscriber event notification registration request using SOAP conventions, passing the request along to a local SOAP-JMS Architecture 106. EventSubscriber 152 registers with SOAP-JMS Architecture 106 stating its desire to receive notification of specific events. Having registered with SOAP-JMS Architecture 106, an EventListenerDeploymentDescriptor 158 entry is created for later use. SOAP-JMS Architecture 106 uses EventListenerDepolymentDescriptor 158 to determine where to find subscribers and what resources may be needed. SOAP-JMS Architecture 106 having used EventListenerDeploymentDescriptor 158 to locate the appropriate subscriber entries sends the event notification to EventListener 156. In turn, SOAP-JMS Architecture 102 transforms the event notification request into JMS form and passes the request along to JMS server 102 for processing. JMS server 102 creates Op(OutMsg) 104. Op(OutMsg) 104 can either be pushed out on a network through Web Service Architecture 160 or event subscribers may visit JMS server 102 looking for messages.

When publishing is directed to a remote JMS server 102, External Event Publisher 162 creates an event request and relies on Web Service Architecture 160 to deliver the request to the designated JMS server. As before, the event request appears at remote JMS server 102 on remote coarse-grain business component 150 as a Op(InMsg) 154 and is processed accordingly. JMS server 102 sends the Op(InMsg) 154 to SOAP-JMS Architecture 106 where Event Subscriber 152 has registered for event notification, creating entries in an associated EventListenerDepolymentDescriptor 158. SOAP-JMS Architecture 106 uses EventListenerDepolymentDescriptor 158 to determine where to find subscribers and what resources may be needed. SOAP-JMS Architecture 106 having used EventListenerDeploymentDescriptor 158 to locate the appropriate subscriber entries sends the event notification to EventListener 156.

An application need not be a full featured entity, it may be a simple program checking status of a particular operation or it may be a collection of software elements working together sharing event information among the parts of the application or with other parts of other applications. All elements of the invention may be found on one machine or many. The network may or may not exist but communication among the components of the invention and between the invention and the applications is presumed to be evident. Application data may be accessed by programmatic means in conjunction with the application or unknown to the application, as a case may be made for efficiency.

Although the present invention and its advantages have been described in detail, it should be understood that various changes, substitutions and alterations can be made herein without departing from the spirit and scope of the invention as defined by the appended claims.

What is claimed is:

1. A method for communicating an event over a network between a provider and a subscriber, said method comprising the steps of:
   registering said event with an event server;
   registering said subscriber with said event server as an event listener in said first document, wherein said first document is an event listener deployment descriptor;
   creating a descriptor of said event;
   publishing said descriptor in a second document;
   providing notification of said event to a first intermediary by said provider;
   sending said notification to said event listener in accordance with said event descriptor in said second document;
   locating said subscriber in said first document in response to receiving notification on said event server;
   transforming said notification into a common form, wherein said first intermediary uses a SOAP-JMS form as said common form;
   transforming said common form into an event server form; and
   making said event server form of said notification available to said subscriber;
   wherein the step of registering said subscriber with said event server further comprises the steps of:
      receiving a registration request from said subscriber at said first intermediary in said common form;
      transforming said common form into said event server form by said first intermediary and sending said request to said event server; and
      responsive to said request, publishing said descriptor from said second document by said event server;
   wherein said notification is sent to said first intermediary passing notification to said second intermediary, said second intermediary locating said descriptor for a predetermined event listener in the first document and sending said event notification to said event listener in accordance with said descriptor found in said first document;
   wherein the step of publishing further comprises the steps of:
      invoking a publish request through one of said first and said second intermediary;
      responsive to said publish request, said one of said first and said second intermediary directing said request to a predetermined event server; and
      responsive to said request said event server publishing said event.

2. The method of claim 1, wherein the step of publishing further comprises the steps of:
   sending said event server form of said notification for said subscriber via said first intermediary;
   responsive to said event server notification, said first intermediary finding said event listener associated with said subscriber in said first document; and
   sending said event server notification by said first intermediary to said event listener.

3. The method of claim 2, further comprising the steps of:
   publishing said event by a publisher located on a remote computing device to a web service;
   said web service responsive to receipt of said published event, directing said published event toward a preselected event server; and
   said preselected event server responsive to receipt of said published event, routing said published event to said subscriber.

4. The method of claim 3, wherein said request is said event server notification issued to all subscribers and non-subscribers of said event server notification.

5. The method of claim 4, wherein said transforming said common form into said event server form is made between a SOAP-JMS Architecture and a JMS event server form.

6. The method of claim 5, wherein said document is created in accordance with a Web Services Description Language WSDL convention.

7. The method of claim 6, wherein communication occurs over a Web Services Architecture network implementation.

* * * * *